US012752845B2

(12) # United States Patent

Rouleau et al.

(10) Patent No.: US 12,752,845 B2

(45) Date of Patent: Oct. 6, 2026

(54) SENSOR GEAR ASSEMBLY WITH ANTI-LASH TEETH FOR STEERING SYSTEM

(71) Applicant: Steering Solutions IP Holding Corporation, Saginaw, MI (US)

(72) Inventors: James E. Rouleau, Burt, MI (US); Shawn A. Haring, Swartz Creek, MI (US); Damian Z. Gosztyla, Bay City, MI (US); Joseph A. Beck, Saginaw, MI (US); Margaret R. Szeliga, Essexville, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 189 days.

(21) Appl. No.: 18/585,397

(22) Filed: Feb. 23, 2024

(65) Prior Publication Data

US 2024/0286675 A1 Aug. 29, 2024

Related U.S. Application Data

(60) Provisional application No. 63/448,390, filed on Feb. 27, 2023.

(51) Int. Cl.
*B62D 15/02* (2006.01)
*B62D 5/04* (2006.01)

(52) U.S. Cl.
CPC ........... *B62D 15/02* (2013.01); *B62D 5/0442* (2013.01)

(58) Field of Classification Search
CPC .. B62D 15/02; B62D 5/0442; B62D 15/0225; B62D 3/12; F16H 55/14; F16H 55/18
See application file for complete search history.

(56) References Cited

U.S. PATENT DOCUMENTS

2018/0142772 A1* 5/2018 Lee .......................... G01D 5/12
2022/0266891 A1* 8/2022 Park ..................... B62D 5/0481

FOREIGN PATENT DOCUMENTS

RU 2029189 C1 * 2/1995

OTHER PUBLICATIONS

Machine Translation of RU 2029189 C1 PDF File Name: "RU2029189C1_Machine_Translation.pdf" (Year: 1995).*

* cited by examiner

*Primary Examiner* — Grant Moubry
*Assistant Examiner* — Ruben Picon-Feliciano
(74) *Attorney, Agent, or Firm* — Dickinson Wright PLLC

(57) ABSTRACT

A sensor gear assembly for a steering system includes a driving component having a plurality of teeth extending therefrom. The sensor gear assembly also includes a rotatable sensor gear having a plurality of teeth extending radially away from an outer diameter of the rotatable sensor gear, wherein at least a portion of the plurality of teeth of the rotatable sensor gear are flexible.

18 Claims, 2 Drawing Sheets

SENSOR GEAR ASSEMBLY WITH ANTI-LASH TEETH FOR STEERING SYSTEM

CROSS-REFERENCE TO RELATED APPLICATION

This application claims the benefits of priority to U.S. Provisional Application Ser. No. 63/448,390, filed Feb. 27, 2023, the disclosure of which is incorporated by reference herein in its entirety.

FIELD OF THE INVENTION

The present disclosure relates to a sensor gear assembly for displacement sensors in steering systems and, more particularly, to a closed-tip anti-lash teeth assembly for such gear assemblies.

BACKGROUND

Steering systems often include gear assemblies to carry out various steering system functions. Some gears interact with another component, such as a rack to convert rotary motion to translation or substantially linear motion. Sensing of rotary or linear motion is often accomplished with a rotatable sensor gear with anti-backlash features. The rotatable sensor gear may include a bifurcated anti-lash tooth profile. Such a sensor gear may be utilized in a gear assembly to accurately determine angular or linear position. However, these bifurcated sensor gears have the potential of the bifurcated anti-lash tooth splitting and causing erroneous values in sensor readout.

SUMMARY OF THE DISCLOSURE

According to one aspect of the disclosure, a sensor gear assembly for a steering system includes a driving component having a plurality of teeth extending therefrom. The sensor gear assembly also includes a rotatable sensor gear having a plurality of teeth extending radially away from an outer diameter of the rotatable sensor gear, wherein at least a portion of the plurality of teeth of the rotatable sensor gear are flexible.

According to another aspect of the disclosure, a rotatable sensor gear includes a central base having an outer diameter. The rotatable sensor gear also includes a plurality of teeth extending radially away from the outer diameter, wherein each of the plurality of teeth have a closed tip at an end thereof which is distal from the outer diameter, wherein each of the plurality of teeth define an inner pocket to allow the plurality of teeth to be flexible.

These and other advantages and features will become more apparent from the following description taken in conjunction with the drawings.

BRIEF DESCRIPTION OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, disclosed are embodiments that delash an integral sensor gear assembly in an electric power steering (EPS) system—or other type of steering system—for a vehicle. Similar sensor gear assemblies find application in power adjustable steering column assemblies in development whereby absolute position is required for safe function. Although the embodiments disclosed herein are discussed in use with a steering system, it is to be appreciated that other types of applications in other industries may benefit from the sensor gear assembly disclosed herein.

The following discussion is directed to various embodiments of the disclosure. Although certain embodiments are illustrated and/or described in more detail than others, the embodiments should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicles, include various steering system schemes. Often, these various steering schemes include an electric power steering (EPS) system that includes components such as steering wheel, column, rack-pinion gear, electric motor actuator, etc. The EPS system helps the operator to steer a vehicle by providing necessary assist torque and feedback. The assist torque is based on an operator's applied torque. In a steady-state sense, the operator torque and assist torque counter the rack force generated because of tire-road interaction.

Although existing solutions have provided a certain amount of workability, improvements in power steering system design and adaptability continue to be of interest. Accordingly, systems and methods, such as those described herein, configured to provide improved packaging and operational framework of a power steering system, may be desirable. In some embodiments, the systems and methods described herein may be configured to provide improvements to the operational framework of the power steering system.

Figure 1:
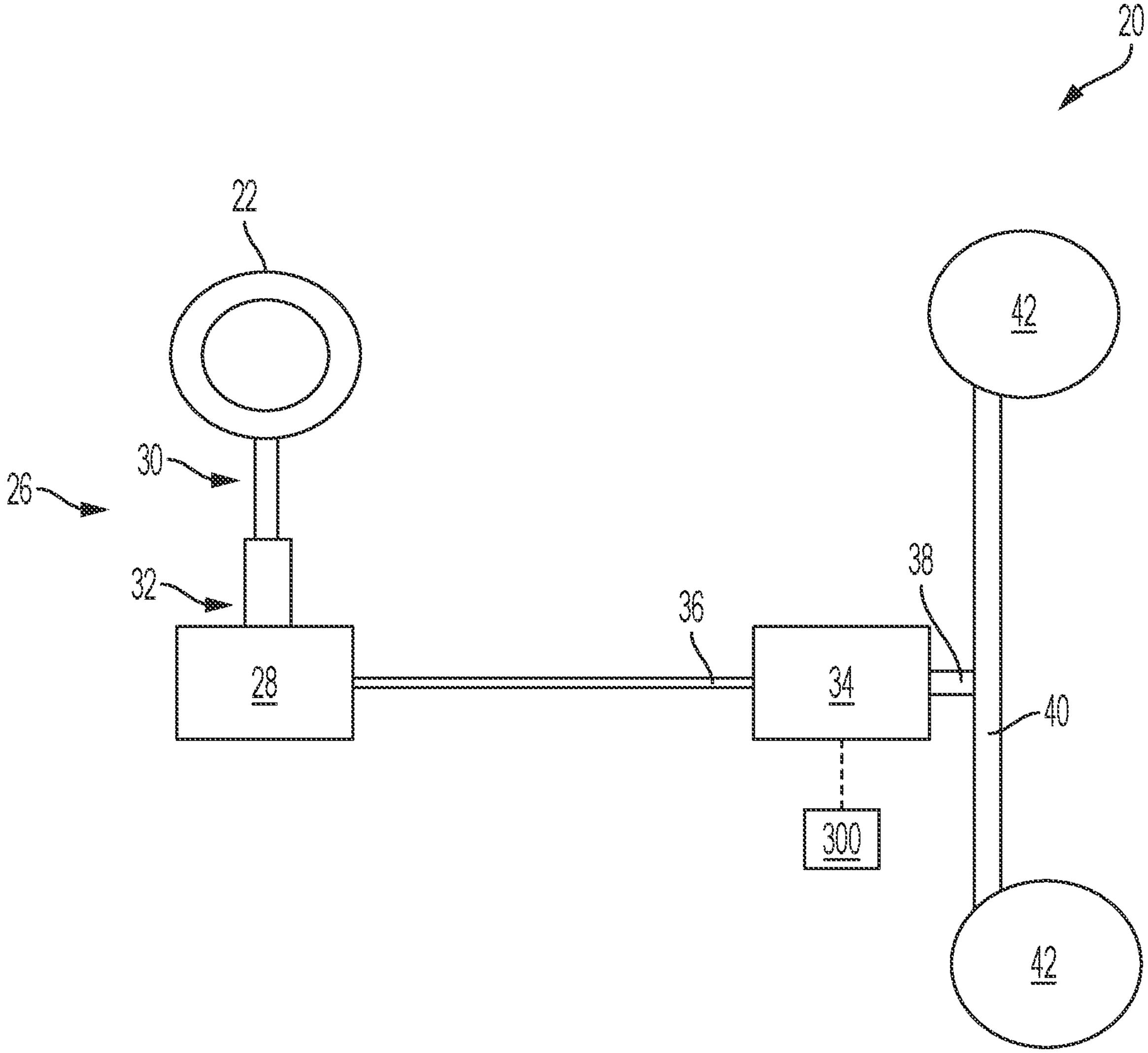
FIG. 1 is a schematic illustration of a steering system.

Referring to FIG. 1, the power steering system 20 is generally illustrated. The power steering system 20 may be configured as a driver interface steering system, an autonomous driving system, or a system that allows for both driver interface and autonomous steering. The steering system may include an input device 22, such as a steering wheel or other handwheel actuator(s), wherein a driver may mechanically provide a steering input by turning the steering wheel. A steering column 26 extends along an axis from the input device 22 to an output assembly 28. The steering column 26 may include at least two axially adjustable parts, for example, a first portion 30 and a second portion 32 that are axially adjustable with respect to one another. The output assembly 28 may include a pinion shaft assembly, an I-shaft, a cardan joint, steer-by-wire components or any other features conventionally located opposite the input device 22. The output assembly 28 may connect to a power-assist assembly 34 (RWA) via a connection 36. The connection 36 may be one of a steering gear input shaft, a continuation of the pinion shaft assembly, or wired or wireless digital communication protocols. Behavior of the power-assist assembly 34 may be controlled via a control system 300.

The power-assist assembly 34 may include steering gear components 38 such as the recirculating ball-type steering gear disclosed herein (also referred to as "eRCB gear system"), driver-interface steering systems, or combinations thereof. The power-assist assembly 34 may then operably connect to a rack 40 via the steering gear components 38. In operation, actuation of the driver input 22 causes a responsive movement of the power-assist assembly 34 and causes the rack 40 to turn driving wheels 42 of an associated vehicle.

The control system 300 may require precise position data from the power assist assembly 34 or the rack 40. To improve the precision, it is desirable to remove lash between the rack—or gear—and the driven sensor gear assembly.

While specific gear arrangements have been disclosed above, it is to be appreciated that various types of gear assemblies may benefit from the embodiments disclosed herein. Therefore, the sensor gear assembly shown in FIG. 2 and described is to be interpreted as being applied to any steering system gear assembly that requires a rotatable sensor gear to interact with teeth of a rack, rack-like structure, gear, or sector.

Figure 2:
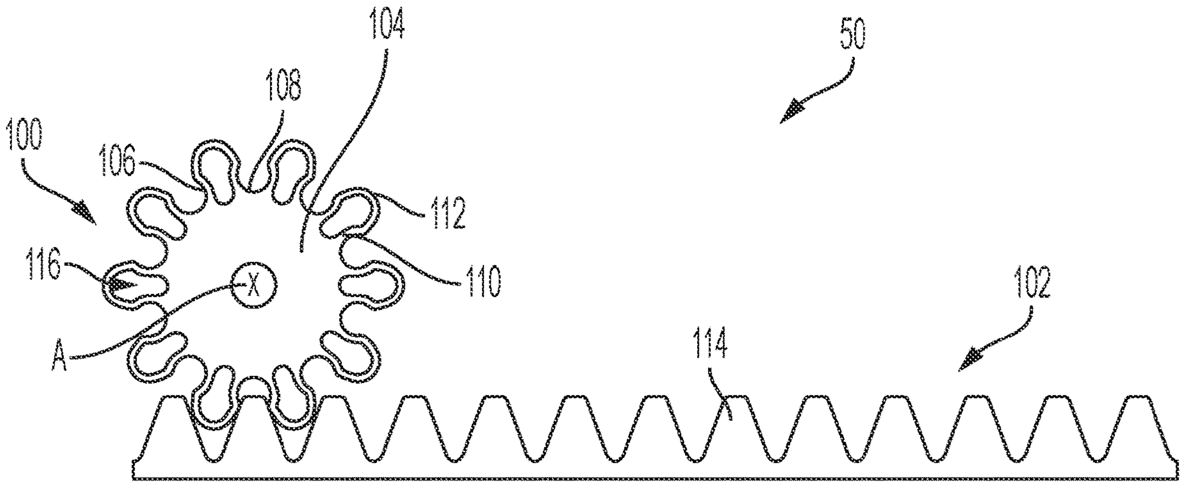
FIG. 2 is an elevation view of a gear assembly of the steering system.

Referring now to FIG. 2, a sensor gear assembly is illustrated and generally referenced with numeral 50. The sensor gear assembly 50 includes a rotatable sensor gear 100, which is shown interacting with a driving component 102 which drives rotation of the rotatable sensor gear 100. Although referred to as a rotatable sensor gear, it is to be understood that a cog is a term which also may be used to refer to the toothed sensor component disclosed herein. In some embodiments, the driving component 102 is a rack 102 and the terms may be used interchangeable herein.

The rotatable sensor gear 100 includes a central base 104 that is rotatable about a rotation axis A. The central base 104 has a plurality of teeth 106 extending radially away from an outer diameter 108 of the central base 104. The plurality of teeth are circumferentially spaced from each other about the outer diameter 108. Although the illustrated embodiment depicts ten (10) teeth extending from the central base 104, it is to be appreciated that alternative numbers of teeth may be present. For example, 11 teeth may be included. Alternatively, more than 11 teeth or fewer than ten (10) teeth may be present.

Each of the plurality of teeth 106 include a first portion 110 and a second portion 112. The first portion 110 is radially adjacent to the outer diameter 108 of the central base 104, such that the first portion 110 extends immediately from the central base 104. The second portion 112 extends radially outward from the first portion 110. In the illustrated embodiment, the second portion 112 has a dimension that is larger than a corresponding dimension of the first portion 110. As used herein, the term dimension, when used in association with the comparison between the first portion 110 and the second portion 112, refers to a width or diameter. The second portion 112 may have a bulb-like geometry, whereas the first portion 110 may be substantially cylindrical or have a more linear geometry when compared to the second portion 112. However, the preceding relative geometries are not limiting of the disclosed embodiments.

As the rotatable sensor gear 100 rotates into the mating component (e.g., rack 102), the plurality of teeth 106 which are in engagement with a plurality of rack teeth 114 deflect to fill space between the rack teeth 114. As such, the flexible teeth 106 prevent lash between the interacting components. The tip of each of the plurality of teeth 106 is closed, thereby defining a pocket 116 within each of the sensor gear teeth 106. The pocket 116 allows the teeth 106, particularly at the second portion 112, to deflect and provide anti-lash capabilities, while not being susceptible to splitting from misalignment to the mating gear/rack 102.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A sensor gear assembly for a steering system comprising:

a driving component having a plurality of teeth extending therefrom; and a rotatable sensor gear having a plurality of teeth extending radially away from an outer diameter of the rotatable sensor gear, wherein each of the plurality of teeth include a first portion and a second portion, the first portion being radially adjacent to the outer diameter of the rotatable sensor gear, the second portion extending radially outward from the first portion, wherein the second portion has a bulb-like geometry, wherein the tip of each of the plurality of teeth is closed, thereby defining an inner pocket within each of the plurality of teeth, and wherein the inner pocket allows the plurality of teeth to deflect to fill space between the plurality of teeth of the driving component to prevent lash between the interacting components.

2. The sensor gear assembly of claim 1, wherein the second portion is made of a material having a spring constant within a range of 0.5 N/mm to 5 N/mm to ensure controlled deflection.

3. The sensor gear assembly of claim 1, wherein the first portion and the second portion have different widths.

4. The sensor gear assembly of claim 3, wherein the second portion has a width which is wider than a width of the first portion.

5. The sensor gear assembly of claim 1, wherein the first portion and the second portion have different diameters.

6. The sensor gear assembly of claim 5, wherein the second portion has a diameter which is larger than a diameter of the first portion.

7. The sensor gear assembly of claim 1, wherein the driving component is a rack.

8. The sensor gear assembly of claim 1, wherein the driving component is a gear.

9. The sensor gear assembly of claim 1, wherein the plurality of teeth of the rotatable sensor gear includes 10 teeth.

10. The sensor gear assembly of claim 1, wherein the plurality of teeth of the rotatable sensor gear includes 11 teeth.

11. A rotatable sensor gear comprising:

a central base having an outer diameter; and a plurality of teeth extending radially away from the outer diameter, wherein each of the plurality of teeth includes a first portion and a second portion, the first portion being radially adjacent to the outer diameter, the second portion extending radially outward from the first portion, wherein the second portion has a bulb-like geometry, wherein the tip of each of the plurality of teeth is closed, thereby defining an inner pocket within each of the plurality of teeth, wherein the inner pocket allows the second portion of the plurality of teeth to deflect and provide anti-lash capabilities during engagement with teeth of a mating component, while not being susceptible to splitting from misalignment to the mating component.

12. The rotatable sensor gear of claim 11, wherein the first portion and the second portion have different cross-sectional areas.

13. The rotatable sensor gear of claim 12, wherein the first portion and the second portion have different widths.

14. The rotatable sensor gear of claim 13, wherein the second portion has a width which is wider than a width of the first portion.

15. The rotatable sensor gear of claim 12, wherein the first portion and the second portion have different diameters.

16. The rotatable sensor gear of claim 15, wherein the second portion has a diameter which is larger than a diameter of the first portion.

17. The rotatable sensor gear of claim 11, wherein the plurality of teeth of the rotatable sensor gear includes 10 teeth.

18. The rotatable sensor gear of claim 11, wherein the plurality of teeth of the rotatable sensor gear includes 11 teeth.

* * * * *